(12) United States Patent
Yamana (10) Patent No.: US 11,575,831 B2
(45) Date of Patent: Feb. 7, 2023

(54) APPARATUS, CORRECTION APPARATUS, AND CORRECTION METHOD

(71) Applicant: CANON KABUSHIKI KAISHA, Tokyo (JP)

(72) Inventor: Kazuaki Yamana, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/673,064

(22) Filed: Feb. 16, 2022

(65) Prior Publication Data
US 2022/0272276 A1    Aug. 25, 2022

(30) Foreign Application Priority Data

Feb. 24, 2021 (JP) .............................. JP2021-027611

(51) Int. Cl.
*H04N 5/232* (2006.01)
*G03B 17/14* (2021.01)
*G03B 5/04* (2021.01)

(52) U.S. Cl.
CPC ......... *H04N 5/232411* (2018.08); *G03B 5/04* (2013.01); *G03B 17/14* (2013.01); *H04N 5/23287* (2013.01); *H04N 5/232941* (2018.08); *G03B 2205/0015* (2013.01)

(58) Field of Classification Search
CPC ..................... H04N 5/232411; H04N 232/87
See application file for complete search history.

(56) References Cited

U.S. PATENT DOCUMENTS

| | | | | |
|---|---|---|---|---|
| 2003/0007075 A1* | 1/2003 | Masuda | ............. | H04N 5/23258 348/208.11 |
| 2003/0118335 A1* | 6/2003 | Uchida | .................... | G03B 5/00 348/E5.046 |
| 2005/0052538 A1* | 3/2005 | Sato | .................... | H04N 5/23245 348/208.1 |
| 2009/0180770 A1* | 7/2009 | Honjo | .................... | G03B 17/14 396/55 |
| 2012/0026348 A1* | 2/2012 | Yun | .................... | H04N 5/23258 348/208.4 |
| 2016/0173783 A1* | 6/2016 | Kim | .................... | H04N 5/23287 348/208.11 |
| 2019/0182427 A1* | 6/2019 | Wachi | ................ | H04N 5/23209 |
| 2020/0329201 A1* | 10/2020 | Kitagawa | ........... | H04N 5/23287 |

FOREIGN PATENT DOCUMENTS

JP        2008107646 A    5/2008

* cited by examiner

*Primary Examiner* — Twyler L Haskins
*Assistant Examiner* — Dwight Alex C Tejano
(74) *Attorney, Agent, or Firm* — Canon U.S.A., Inc. IP Division

(57) ABSTRACT

An apparatus includes a first correction unit including a first movable unit and a first mechanism configured to lock a position of the first movable unit. An interchangeable lens including a second correction unit is attachable to and detachable from the apparatus, and the second correction unit includes a second movable unit and a second mechanism configured to lock a position of the second movable unit. The apparatus further includes a control unit configured to, when the interchangeable lens is attached to the apparatus and one of the first and second movable units is fixed by the first or second mechanism, move the position of the other movable unit in a direction that cancels a shift of an optical axis caused by the fixation of the one of the first and second movable units.

20 Claims, 8 Drawing Sheets

APPARATUS, CORRECTION APPARATUS, AND CORRECTION METHOD

BACKGROUND

Field of the Disclosure

The aspect of the embodiments relates to an apparatus, a correction apparatus, and a correction method.

Description of the Related Art

Imaging apparatuses with a high number of pixels and high sensitivity have been provided in recent years and thus there is a demand for an image blur correction apparatus capable of accurately moving an optical component, such as a lens, or an image sensor of an imaging apparatus in a long stroke. However, there is an issue where power consumption increases in using an interchangeable lens and an imaging apparatus that are both include respective image blur correction apparatuses.

On the other hand, imaging apparatuses have been demanded to provide lower power consumption to be able to capture as many images as possible. For this reason, there is a demand for an imaging system that ensures both image blur correction performance and low power consumption.

For example, Japanese Patent Application Laid-Open No. 2008-107646 discusses a technique for controlling selection between an image blur correction apparatus of a lens and an image blur correction apparatus of an imaging apparatus.

However, with the technique discussed in Japanese Patent Application Laid-Open No. 2008-107646, the deselected image blur correction apparatus is electromagnetically locked and thus consumes power.

Mechanically locking the deselected image blur correction apparatus can reduce the power consumption. However, there is an issue where a slight difference occurs between imaging optical axes of the interchangeable lens and the imaging apparatus due to nonuniformity in part dimension and urging force for the locking.

SUMMARY OF THE DISCLOSURE

According to an aspect of the embodiments, an apparatus includes a first correction unit including a first movable unit and a first mechanism configured to lock a position of the first movable unit. An interchangeable lens including a second correction unit is attachable to and detachable from the apparatus, and the second correction unit includes a second movable unit and a second mechanism configured to lock a position of the second movable unit. The apparatus further comprises a control unit configured to, in a case where the interchangeable lens is attached to the apparatus and one of the first movable unit and the second movable unit is fixed by the first mechanism or the second mechanism, move the position of the other of the first movable unit and the second movable unit in a direction that cancels a shift of an optical axis caused by the fixation of the one of the first movable unit and the second movable unit.

Further features of the disclosure will become apparent from the following description of exemplary embodiments with reference to the attached drawings.

DESCRIPTION OF THE EMBODIMENTS

Exemplary embodiments of the disclosure will be described below with reference to the accompanying drawings.

Figure 1:
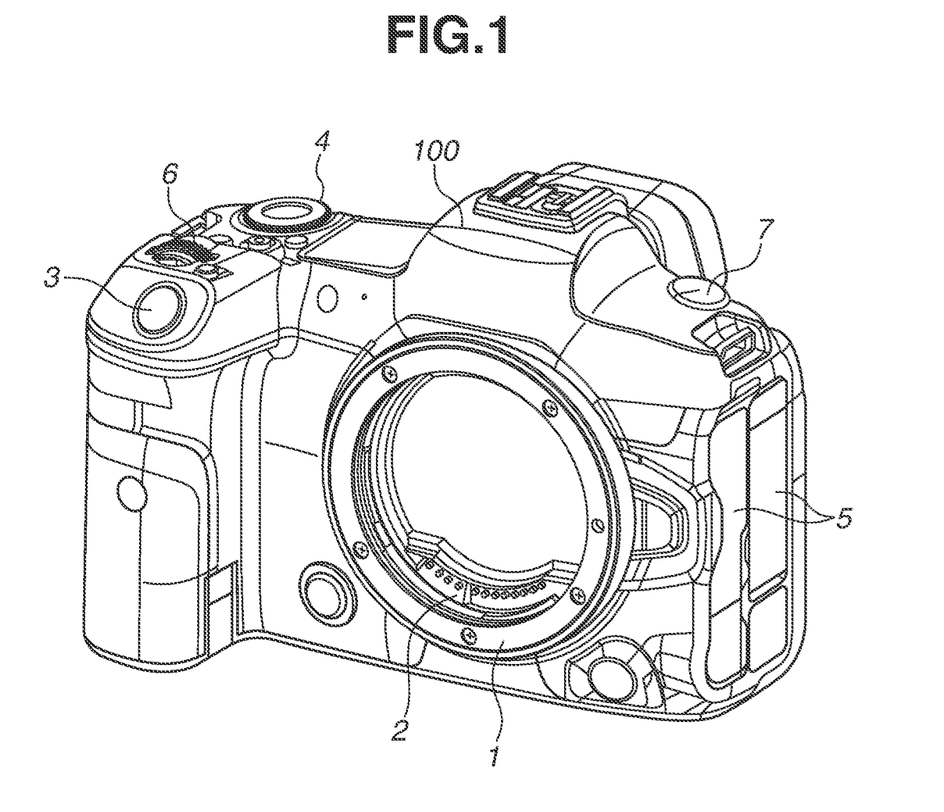
FIG. 1 is a perspective view illustrating a front of a camera according to an exemplary embodiment of the disclosure.

FIG. 1 is a perspective view illustrating a front of a camera 100 according to an exemplary embodiment of the disclosure. A shutter button 3 is an operation member for issuing an imaging instruction. A mode selection switch 4 is an operation member for selecting among various modes. A terminal cover 5 protects an interface connector (not illustrated). A main electronic dial 6 is a rotational operation member that is rotated by a user to change imaging parameters related to a shutter speed, a diaphragm and the like. A power dial 7 is an operation member for powering on or off the camera 100.

An imaging lens 200 (described below) is attached to and detached from a mount 1. A camera communication unit 2 includes a terminal located inside the mount 1. The terminal of the camera communication unit 2 and a lens communication terminal 214 (described below) are electrically connected to each other to enable communication between the camera 100 and the imaging lens 200.

Figure 2:
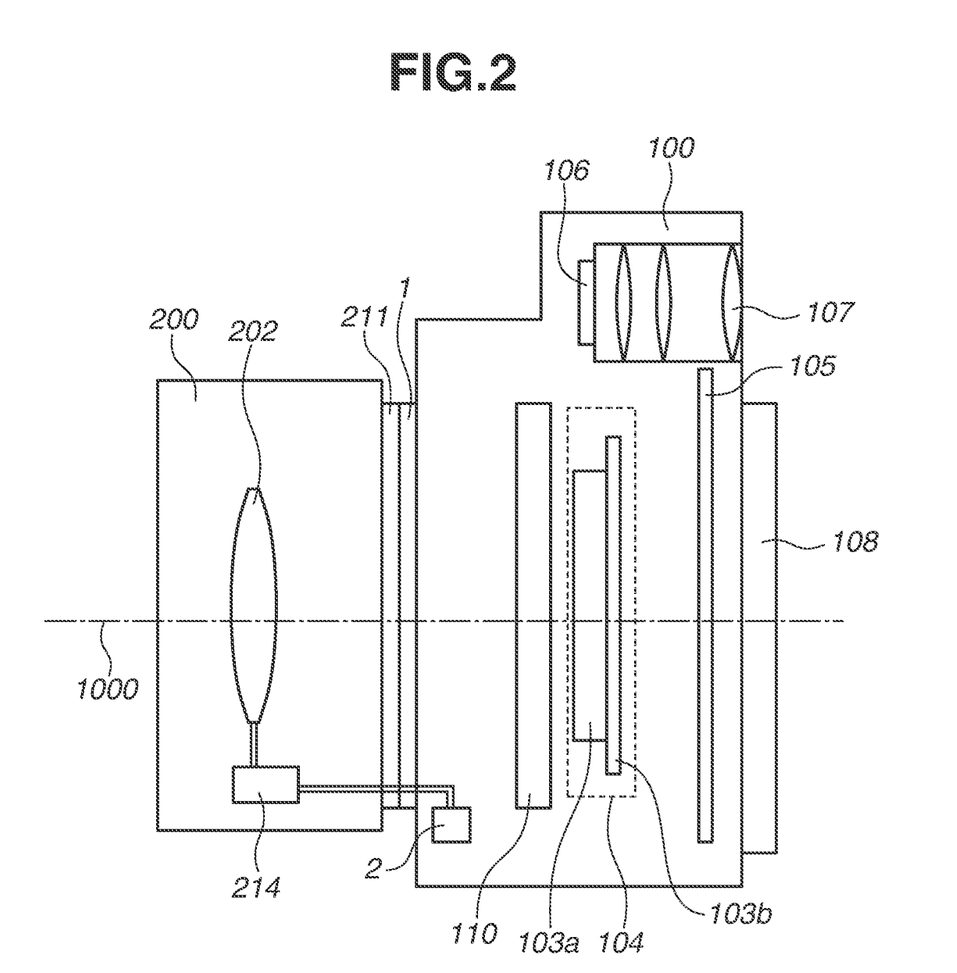
FIG. 2 is a schematic view illustrating an internal configuration of the camera according to an exemplary embodiment of the disclosure.

FIG. 2 is a schematic view illustrating an internal configuration of the camera 100. FIG. 2 mainly illustrates portions related to exemplary embodiments of the disclosure. The imaging lens 200 is an interchangeable lens exchangeably attached to the camera 100, and includes a focus lens 202, an image blur correction unit 205 (described below), and a diaphragm mechanism 204 (described below).

While in the present exemplary embodiment, the imaging lens 200 is exchangeably attached to the camera 100, the imaging lens 200 may not be exchangeable and may be integrally fixed to the camera 100.

The lens communication terminal 214 is located inside a lens mount 211 to enable communication between the camera 100 and the imaging lens 200 via the camera communication unit 2. In the camera 100, an image sensor 103a such as a charge coupled device (CCD) image sensor or a complementary metal oxide semiconductor (CMOS) image sensor is attached to an imaging substrate 103b, and a main substrate 105 is located on a back side of the imaging substrate 103b and is provided with a system control circuit 101 (described below) that performs various types of processing. An image blur correction unit 104 includes an image sensor unit 103 including the image sensor 103a and the imaging substrate 103b, an image blur correction control unit 72 (described below), and a lock mechanism 150 (described below). Components, such as a central processing unit (CPU) and a micro-processing unit (MPU), serving as the system control circuit 101 that performs various types of processing of the camera 100 may not be mounted on the main substrate 105. Instead, at least part of the components may be mounted on the imaging substrate 103b.

An in-finder display unit 106 and a contact lens 107 are provided in an upper portion of the camera 100. The in-finder display unit 106 is used to check imaging conditions, an image composition, and a captured image. The contact lens 107 is used to observe a subject image. A back display unit 108 and recording medium slots 30 and 40 (described below) are provided on a back of the camera 100. The back display unit 108 is used to check imaging conditions, an image composition, and a captured image. The recording medium slots 30 and 40 are used to store removable recording media 300 and 400 (described below) that record generated image data, respectively.

The imaging substrate 103b and the main substrate 105 are electrically connected to each other via a connection substrate (not illustrated). A shutter 110 for adjusting an exposure time is located on a front side (a subject side) of the image sensor 103a.

A light flux incident on the imaging lens 200 is guided through the diaphragm mechanism 204 and the shutter 110, and forms an optical image on an imaging plane of the image sensor 103a.

The mount 1 is an interface that connects the camera 100 and the imaging lens 200 and is fixed to the lens mount 211 through a bayonet connection.

Figure 3:
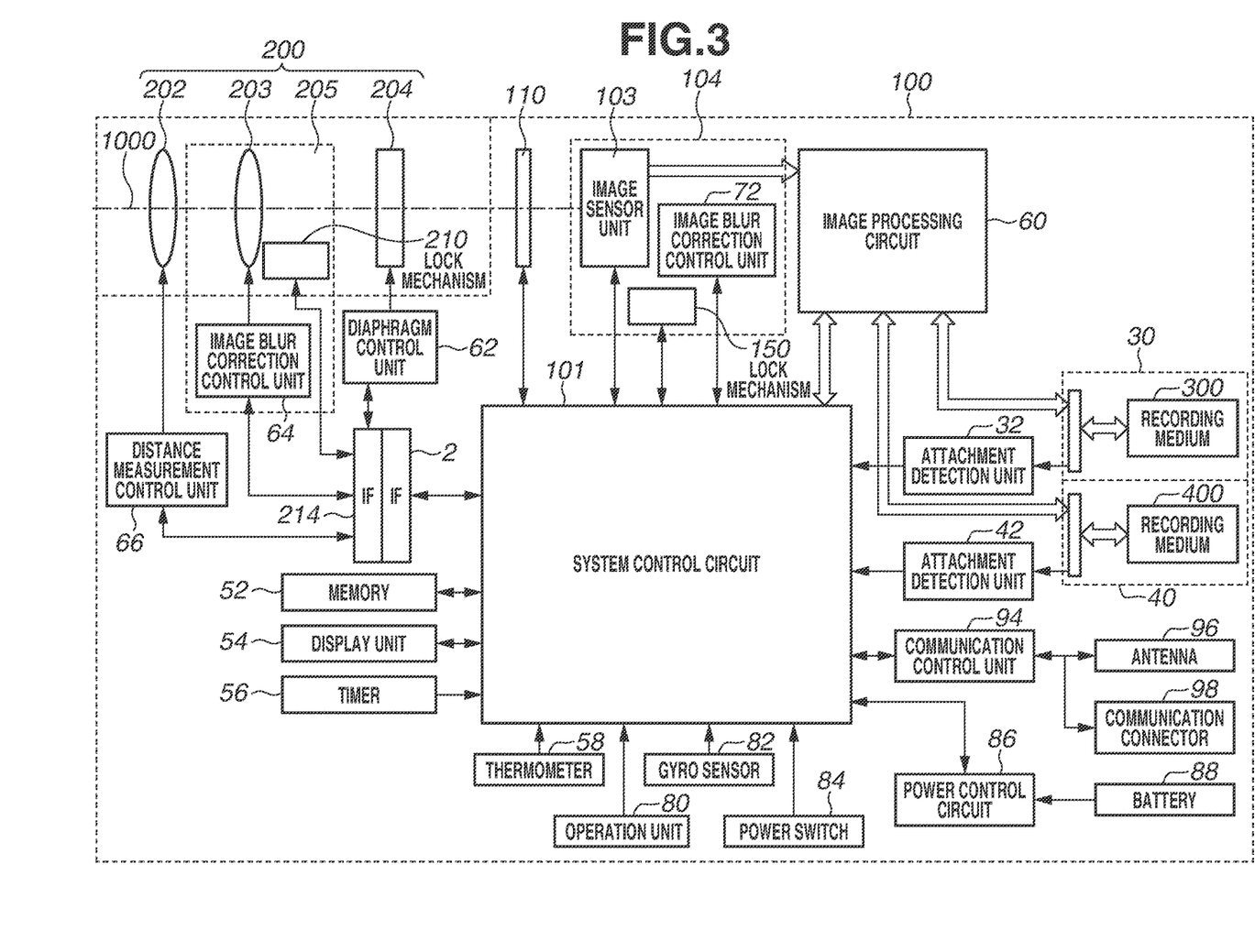
FIG. 3 is a block diagram illustrating electrical connections in the camera according to an exemplary embodiment of the disclosure.

FIG. 3 is a block diagram illustrating electrical connections in the camera 100.

The recording media 300 and 400 are, for example, memory cards stored in the recording medium slots 30 and 40, respectively.

The image blur correction unit 104 as a first image blur correction unit includes a movable unit 104a (described below) as a first movable unit, a fixed unit 104b (described below), and the lock mechanism 150 as a first lock mechanism. The image blur correction control unit 72 corrects an image blur by driving the movable unit 104a in a direction perpendicular to an imaging optical axis 1000 based on a movement (a shake amount) of the camera 100 detected by a gyro sensor 82. The lock mechanism 150 urges the movable unit 104a in a direction parallel to the imaging optical axis 1000 to mechanically lock a position of the movable unit 104a.

The image blur correction unit 205 as a second image blur correction unit includes an image blur correction lens 203 as a second movable unit, an image blur correction control unit 64, and a lock mechanism 210 as a second lock mechanism. The image blur correction control unit 64 corrects an image blur by driving the image blur correction lens 203 in the direction perpendicular to the imaging optical axis 1000 based on the movement (the shake amount) of the camera 100 detected by the gyro sensor 82.

The lock mechanism 210 turns a lock member (not illustrated) through a motor and a gear train (not illustrated) to mechanically lock the image blur correction lens 203. Although other types of lock mechanisms are applicable, all of the lock mechanisms are known and thus descriptions thereof will be omitted in the present exemplary embodiment.

If the imaging lens 200 is provided with a gyro sensor, the image blur correction lens 203 may be driven based on a result detected by the gyro sensor of the imaging lens 200 instead of the gyro sensor 82.

The recording media slot (the first card slot) 30 is dedicated for the recording medium 300. When the recording medium 300 is attached to the first card slot 30, the attachment is detected by an attachment detection unit 32. The recording media slot (the second card slot) 40 is dedicated for the recording medium 400. When the recording medium 400 is attached to the second card slot 40, the attachment is detected by an attachment detection unit 42.

The system control circuit 101 that controls the entire camera 100 is mounted on the main substrate 105. A memory 52 stores constants, variables, and programs for operations of the system control circuit 101. The system control circuit 101 also controls the shutter 110 and the diaphragm mechanism 204 of the imaging lens 200 to perform automatic focus (AF) processing and automatic exposure (AE) processing, based on a result of calculation performed by an image processing circuit 60 on image data of an image captured by the image sensor 103a. In AE processing, a diaphragm control unit 62 controls the diaphragm mechanism 204. In AF processing, a distance measurement control unit 66 controls the focus lens 202.

A display unit 54 is a liquid crystal display that displays an operating status, a warning message, a live view image, a captured image, or the like. The display unit 54 is included in the back display unit 108. A timer 56 measures a predetermined time period. A thermometer 58 measures a temperature of the image sensor 103a.

The image processing circuit 60 subjects the image data of the image captured by the image sensor 103a to pixel interpolation processing, color conversion processing, and predetermined image processing corresponding to preset moving image recording settings (including moving image recording image quality and a moving image recording format).

An operation unit 80 includes various buttons, switches, and dials, such as the shutter button 3, the mode selection switch 4, the main electronic dial 6, and the power dial 7. The operation unit 80 is used to select various functions and make settings at the time of imaging, reproduction, communication, and the like, and issue instructions for imaging and reproduction.

The gyro sensor 82 detects the movement (the shake amount) of the camera 100 as an angular velocity. A power switch 84 powers on or off the camera 100 based on an operation on the power dial 7.

A battery 88 is attachable to and detachable from the camera 100. A power control circuit 86 communicates with the battery 88 to acquire information about a remaining battery level of the battery 88. The power control circuit 86 transmits the acquired information about the remaining battery level to the system control circuit 101.

A communication control unit 94 controls wireless communication with an external device (not illustrated) via an antenna 96 and wired communication therewith via a communication connector 98.

Figure 4:
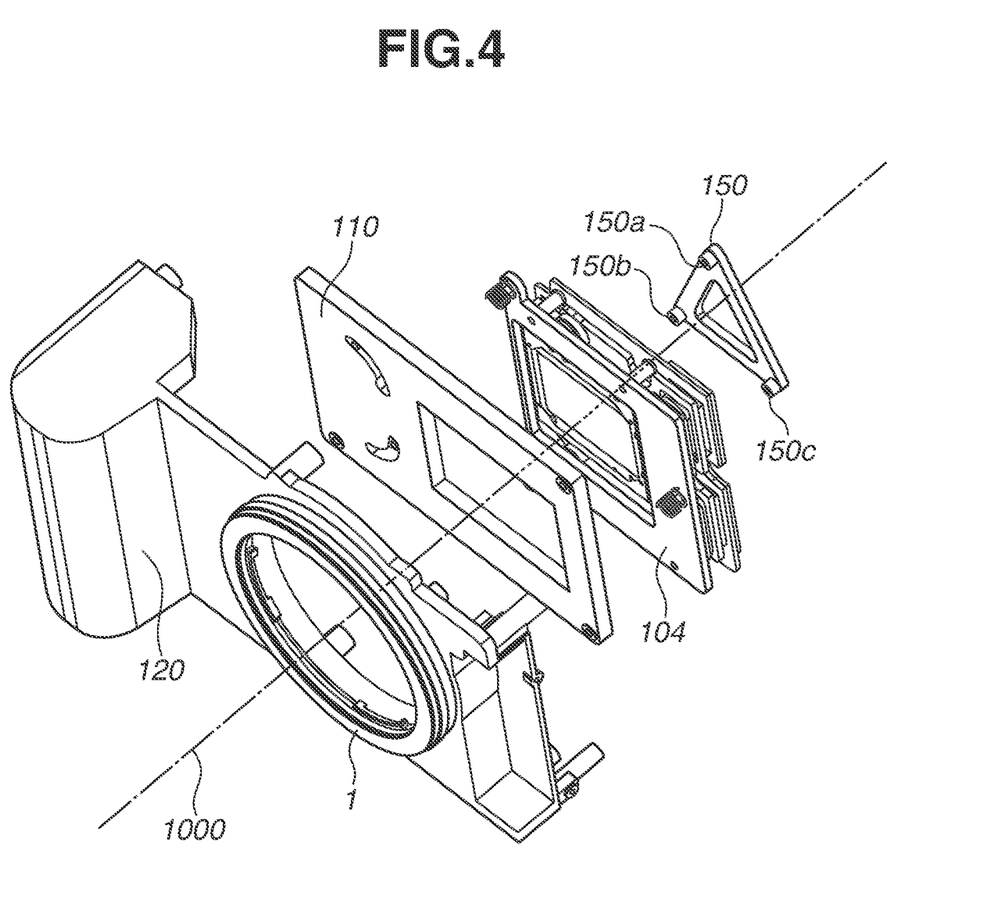
FIG. 4 is an exploded perspective view illustrating a main internal configuration of the camera according to an exemplary embodiment of the disclosure.

FIG. 4 is an exploded view illustrating a main internal configuration of the camera 100. The image blur correction unit 104 is fixed to a base member 120 together with the shutter 110.

The lock mechanism 150 of the image blur correction unit 104 is disposed more posteriorly than the image sensor 103a (disposed on an imaging person side), and can be moved in a direction of the imaging optical axis 1000 by a drive mechanism including a motor and a gear train (not illustrated).

Figure 5A:
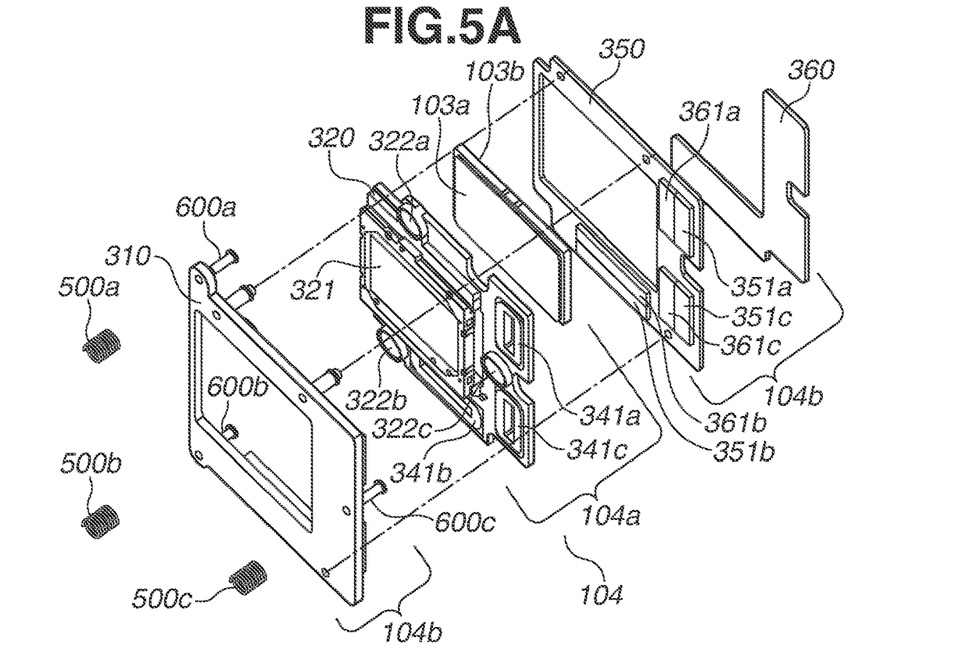
FIGS. 5A and 5B are exploded perspective views illustrating an image blur correction unit in the camera according to an exemplary embodiment of the disclosure.
Figure 5B:
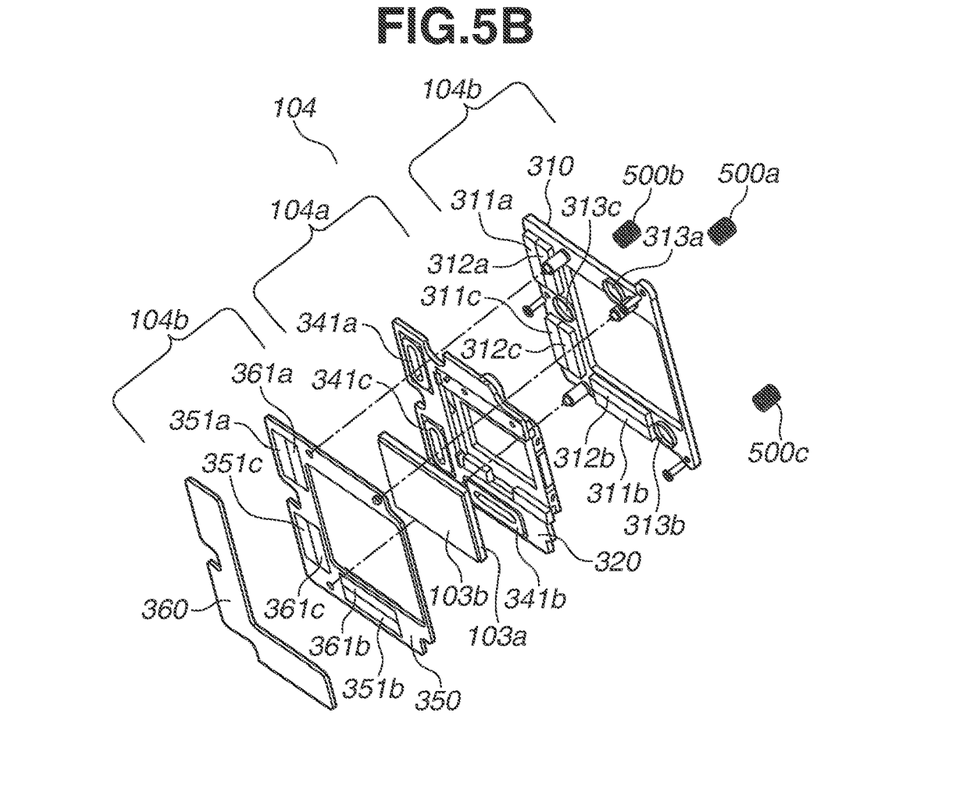

FIGS. 5A and 5B are exploded perspective views illustrating the image blur correction unit 104 of the camera 100. The image blur correction unit 104 includes the movable unit 104a and the fixed unit 104b as a fixed portion. The movable unit 104a includes the image sensor 103a. The fixed unit 104b is fixed to the base member 120. The image blur correction unit 104 is displaceably supported by three screws 600a, 600b, and 600c and three coil springs 500a, 500b, and 500c in the direction of the imaging optical axis 1000 with respect to the base member 120.

The fixed unit 104b mainly includes a front yoke 310, a base plate 350, and a back yoke 360. The movable unit 104a mainly includes a sensor holder 320, a low-pass filter 321, and the image sensor 103a.

The image sensor 103a and the imaging substrate 103b are bonded and fixed to the sensor holder 320. In the sensor holder 320, the low-pass filter 321 is disposed more anteriorly than the image sensor 103a. The low-pass filter 321 prevents incidence of infrared rays to prevent occurrence of color moire.

Three coils 341a, 341b, and 341c are provided in the sensor holder 320. Three ball-receiving portions 322a, 322b, and 322c are also formed in the sensor holder 320. In the front yoke 310, ball-receiving portions 313a, 313b, and 313c are formed at positions facing the ball-receiving portions 322a, 322b, and 322c, respectively.

The sensor holder 320 to which the image sensor 103a and the imaging substrate 103b are bonded and fixed, and the front yoke 310 sandwich three balls between the ball-receiving portions 322a, 322b, and 322c and the ball-receiving portions 313a, 313b, and 313c, respectively, thereby supporting the three balls.

The front yoke 310 is provided with magnets 311a and 312a, magnets 311b and 312b, and magnets 311c and 312c that are stuck at positions facing the coil 341a, the coil 341b, and the coil 341c, respectively.

When the front yoke 310 and the sensor holder 320 are brought close up to a certain distance, the sensor holder 320 is magnetically attracted to the front yoke 310, and is displaceably held by the front yoke 310 via the three balls in a planar direction orthogonal to the imaging optical axis 1000.

On the front yoke 310, columns are vertically provided toward the base plate 350, with one end of each of the columns press-fit into the base plate 350. Thus, the front yoke 310 and the base plate 350 are joined so as to sandwich the sensor holder 320 therebetween.

In the base plate 350, magnets 351a and 361a, magnets 351b and 361b, and magnets 351c and 361c are incorporated at different positions when viewed from the direction of the imaging optical axis 1000. When viewed from the direction of the imaging optical axis 1000, the magnets 351a and 361a, the magnets 351b and 361b, and the magnets 351c and 361c are disposed at approximately the same positions as those of the coil 341a, the coil 341b, and the coil 341c, respectively.

The back yoke 360 is attached to the magnets 351a to 361c on a back side of the base plate 350. Each of the back yoke 360 and the base plate 350 is made of a magnetic material.

A magnetic field is formed by the magnets 311a, to 312c disposed on the front yoke 310, and the magnets 351a to 361c disposed on the back yoke 360. The coils 341a, 341b, and 341c are disposed in the magnetic field environment formed in this way.

The image blur correction unit 104 is configured to pass a current through the coils 341a, 341b, and 341c to generate a Lorentz force in each of the coils 341a, 341b, and 341c, and use the generated Lorentz force as a propulsive force to displace the sensor holder 320 in a direction orthogonal to the imaging optical axis 1000.

Hall elements (not illustrated) serving as position detection sensors are respectively mounted in the coils 341a, 341b, and 341c, and detect magnetic changes that occur when the sensor holder 320 moves relative to the magnets 312a, 312b, and 312c.

Based on the detection results, the image blur correction unit 104 detects the position of the movable unit 104a in the direction orthogonal to the imaging optical axis 1000 with respect to the fixed unit 104b (detects the displacement of the movable unit 104a from a reference position).

Figure 6:
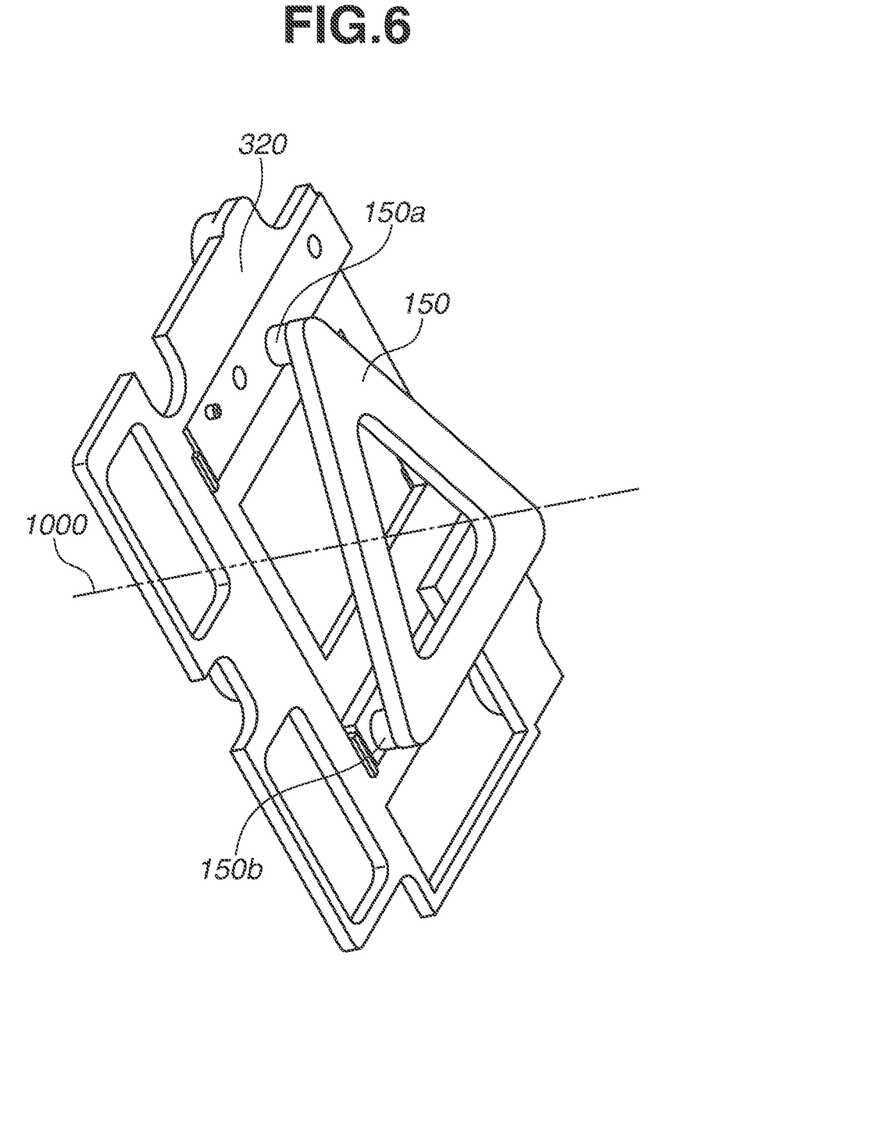
FIG. 6 illustrates a lock mechanism of the camera according to an exemplary embodiment of the disclosure.

FIG. 6 illustrates the lock mechanism 150 of the camera 100.

The lock mechanism 150 is movable in the direction parallel to the imaging optical axis 1000. When the lock mechanism 150 moves toward the front, elastic members 150a, 150b, and 150c (see FIG. 4) come into contact with the sensor holder 320 of the movable unit 104a. After the contact, when the lock mechanism 150 further moves toward the front, the elastic members 150a to 150c are charged (elastically deformed) by a propulsive force of the lock mechanism 150 and the sensor holder 320.

The above-described charge generates a frictional force on the contact surfaces between the sensor holder 320 and the elastic members 150a to 150c, enabling the lock mechanism 150 to lock the position of the movable unit 104a.

Figure 7:
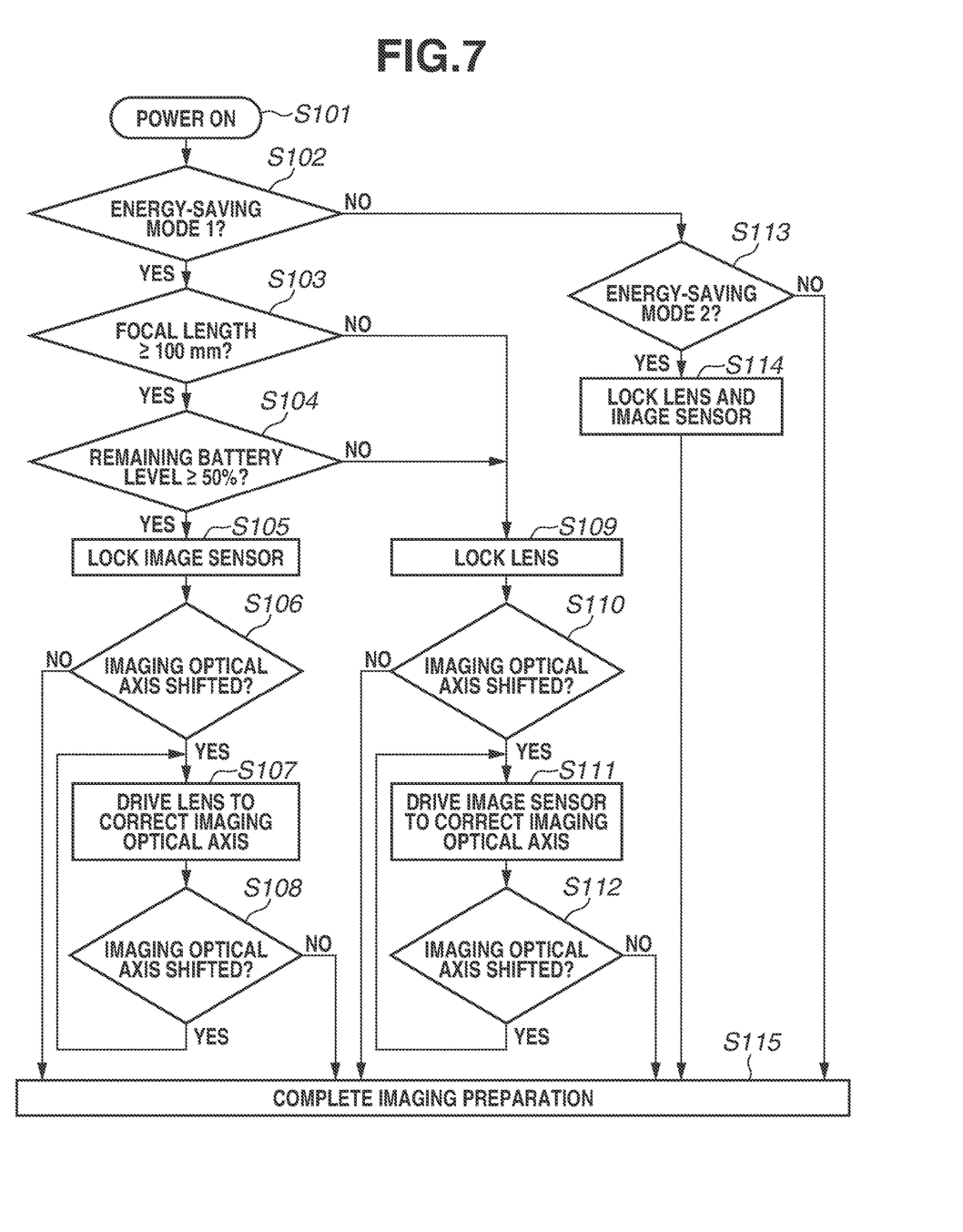
FIG. 7 is a flowchart illustrating an operation of the camera according to a first exemplary embodiment of the disclosure.

A first exemplary embodiment of the disclosure will be described next with reference to FIG. 7. Configurations according to the present exemplary embodiment have been described above with reference to FIGS. 1 to 6, and redundant descriptions thereof will be omitted. FIG. 7 is a flowchart illustrating an operation of the camera 100 according to the present exemplary embodiment.

The camera 100 according to the present exemplary embodiment has two energy-saving modes 1 and 2. The energy-saving mode 1 enables an image blur correction function of one of the image blur correction units 104 and 205, and mechanically locks and disables the other image blur correction unit, thereby implementing both the image blur correction function and energy saving.

The energy-saving mode 2 mechanically locks both the image blur correction units 104 and 205 to minimize the power consumption of the camera 100. Settings of the energy-saving modes 1 and 2 are performed by the system control circuit 101, for example, based on an operation on the mode selection switch 4.

In step S101, the system control circuit 101 powers on the camera 100 based on the operation on the power dial 7, and starts preparations for imaging.

In step S102, the system control circuit 101 determines whether the energy-saving mode 1 is selected by the operation on the mode selection switch 4. If the energy-saving mode 1 is selected (YES in step S102), the system control circuit 101 sets the energy-saving mode 1. Then, the processing proceeds to step S103.

In step S103, the system control circuit 101 checks a focal length of the imaging lens 200 attached to the camera 100. For example, after starting the preparations for imaging, the system control circuit 101 acquires information about the focal length of the imaging lens 200 from the imaging lens 200 via the camera communication unit 2. The system control circuit 101 checks the focal length of the imaging lens 200 to determine which of the image blur correction units 104 and 205 is to be enabled to make the image blur correction more effective in imaging. At this time, the system control circuit 101 determines whether the information about the focal length of the imaging lens 200 is equal to or larger than a predetermined focal length.

In the present exemplary embodiment, if the system control circuit 101 determines that the focal length is shorter than 100 mm (the focal length is shorter than the predetermined focal length) (NO in step S103), the system control circuit 101 enables the image blur correction unit 104. If the system control circuit 101 determines that the focal length is equal to or longer than 100 mm (the focal length is equal to or longer than the predetermined focal length) (YES in step S103), the system control circuit 101 enables the image blur correction unit 205. While in the present exemplary embodiment, the focal length of 100 mm is set as the threshold value as an example of a determination condition, a value of a different focal length or information about image blur correction characteristics other than the focal length may be set as the determination condition.

In step S104, the system control circuit 101 checks the remaining battery level of the camera 100 by using the power control circuit 86. The system control circuit 101 determines whether the information about the remaining battery level is equal to or larger than a predetermined remaining battery level.

In the present exemplary embodiment, if the system control circuit 101 determines that the remaining battery level is less than 50% (the information about the remaining battery level is less than the predetermined remaining battery level) (NO in step S104), the system control circuit 101 enables the image blur correction unit 104 and mechanically locks the image blur correction unit 205 to prolong the imaging time. This is because it is commonly thought that the image blur correction unit 104 of the camera 100 is disposed closer to the battery 88 than the image blur correction unit 205 of the imaging lens 200 and thus provides higher power efficiency. While in the present exemplary embodiment, the remaining battery level of 50% is set as the threshold value as an example of a determination condition, a value of a different remaining battery level may be set as the determination condition. If the system control circuit 101 determines that the remaining battery level is equal to or larger than 50% (the information about the remaining battery level is equal to or larger than the predetermined remaining battery level) (YES in step S104), the system control circuit 101 enables the image blur correction unit 205, giving priority to the determination result based on the focal length.

In step S105, the system control circuit 101 enables the lock mechanism 150 of the image blur correction unit 104 to mechanically lock the image blur correction unit 104. In step S106, the system control circuit 101 determines whether the imaging optical axis 1000 is shifted when the image blur correction unit 104 is mechanically locked by the lock mechanism 150. The system control circuit 101 determines whether the imaging optical axis 1000 is shifted, by determining whether the image sensor 103*a* has moved in the direction orthogonal to the imaging optical axis 1000 before and after the mechanical locking, based on the detection results by the Hall elements serving as the position detection sensors. In a case where the image blur correction unit 104 is configured to be mechanically locked after the image sensor 103*a* is moved to the reference position that is the center of the driving range, the system control circuit 101 may check a difference between the reference position and the position after the locking.

If the system control circuit 101 determines that the imaging optical axis 1000 is not shifted (NO in step S106), the processing proceeds to step S115. In step S115, the system control circuit 101 completes the preparations for imaging. If the system control circuit 101 determines that the imaging optical axis 1000 is shifted (YES in step S106), the processing proceeds to step S107. In step S107, the system control circuit 101 moves the image blur correction lens 203 in the image blur correction unit 205 in the direction that cancels the shift of the imaging optical axis 1000, thereby correcting the imaging optical axis 1000.

In step S108, the system control circuit 101 determines whether the imaging optical axis 1000 is shifted, using a similar method to that in step S106. If the system control circuit 101 determines that the imaging optical axis 1000 is shifted (YES in step S108), the processing returns to step S107. In step S107, the system control circuit 101 corrects the imaging optical axis 1000.

If the system control circuit 101 determines that the imaging optical axis 1000 is not shifted (NO in step S108), the processing proceeds to step S115. In step S115, the system control circuit 101 completes the preparations for imaging.

If the system control circuit 101 determines that the remaining battery level is less than 50% (NO in step S104), the processing proceeds to step S109. In step S109, the system control circuit 101 enables the lock mechanism 210 of the image blur correction unit 205 to mechanically lock the image blur correction unit 205.

In step S110, the system control circuit 101 determines whether the imaging optical axis 1000 is shifted when the image blur correction unit 205 is mechanically locked by the lock mechanism 210. The system control circuit 101 determines whether the imaging optical axis 1000 is shifted, by determining whether the image blur correction lens 203 has moved in the direction orthogonal to the imaging optical axis 1000 before and after the mechanical locking, based on the detection results by the Hall elements serving as the position detection sensors. A known configuration may be employed to detect the position of the image blur correction lens 203 using the Hall elements, and detailed descriptions thereof will be omitted. If the system control circuit 101 determines that the imaging optical axis 1000 is not shifted (NO in step S110), the processing proceeds to step S115. In step S115, the system control circuit 101 completes the preparations for imaging.

If the system control circuit 101 determines that the imaging optical axis 1000 is shifted (YES in step S110), the processing proceeds to step S111. In step S111, the system control circuit 101 moves the image sensor 103*a* in the image blur correction unit 104 in the direction that cancels the shift of the imaging optical axis 1000, thereby correcting the imaging optical axis 1000. In step S112, the system control circuit 101 determines whether the imaging optical axis 1000 is shifted, using a similar method to that in step S110. If the system control circuit 101 determines that the imaging optical axis 1000 is shifted (YES in step S112), the processing returns to step S111. In step S111, the system control circuit 101 corrects the imaging optical axis 1000.

If the system control circuit 101 determines that the imaging optical axis 1000 is not shifted (NO in step S112), the processing proceeds to step S115. In step S115, the system control circuit 101 completes the preparations for imaging.

If the system control circuit 101 determines that the energy-saving mode 1 is not selected (NO in step S102), the processing proceeds to step S113. In step S113, the system control circuit 101 determines whether the energy-saving mode 2 is selected. If the system control circuit 101 determines that the energy-saving mode 2 is selected (YES in step S113), the system control circuit 101 sets the energy-saving mode 2. Then, the processing proceeds to step S114.

If the system control circuit 101 determines that the energy-saving mode 2 is not selected (NO in step S113), the system control circuit 101 determines that neither the energy-saving mode 1 nor the energy-saving mode 2 is selected by the user, and enables both the image blur correction units 104 and 205. Then in step S115, the system control circuit 101 completes the preparations or imaging.

In step S114, the system control circuit 101 mechanically locks both the image blur correction units 104 and 205. Then in step S115, the system control circuit 101 completes the preparations for imaging.

According to the present exemplary embodiment, selecting the energy-saving mode 1 can achieve an imaging mode that implements both image stabilization and energy saving.

Furthermore, according to the present exemplary embodiment, even if one of the image blur correction units 104 and 205 is mechanically locked, moving the other of the image blur correction units 104 and 205 can suppress the shift of imaging optical axis 1000.

In the present exemplary embodiment, the system control circuit 101 determines which of the image blur correction units 104 and 205 is to be mechanically locked, by using not only the operation mode selection result but also the focal length and the remaining battery level as the determination condition. However, the mode selection result may be simply used as the determination condition. Instead of the change based on the energy-saving modes 1 and 2, the user may select a mode in which the image blur correction unit 104 is mechanically locked to perform the image blur correction, or a mode in which the image blur correction unit 205 is mechanically locked to perform the image blur correction.

When performing the image blur correction using the image blur correction unit that has been used to correct the shift of the imaging optical axis 1000, the system control circuit 101 may set the position that has been moved to correct the shift of the imaging optical axis 1000 as the drive center position and then set the driving range with reference to the drive center position.

Figure 8:
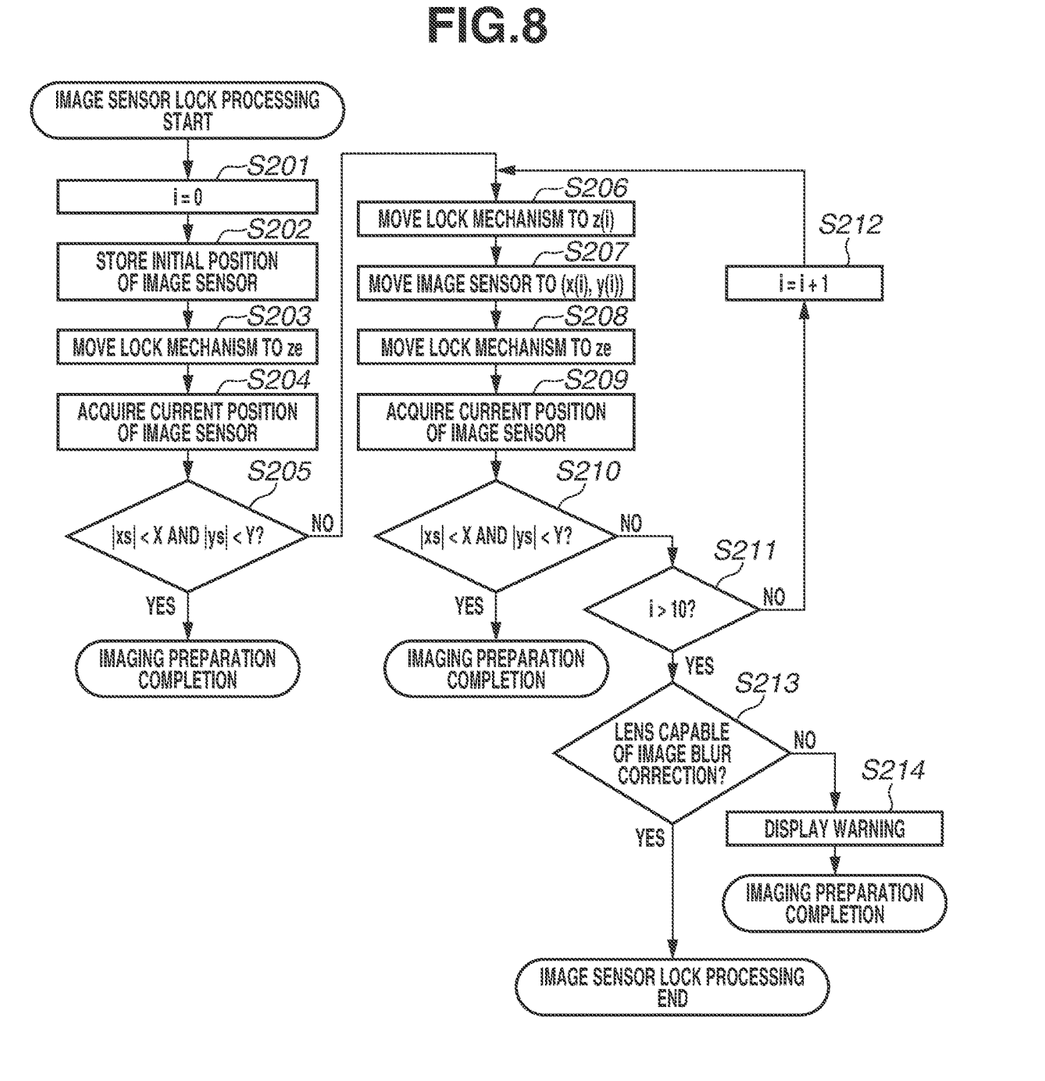
FIG. 8 is a flowchart illustrating drive control for the lock mechanism of the camera according to a second exemplary embodiment of the disclosure.

A second exemplary embodiment of the disclosure will be described next with reference to FIG. 8. Configurations according to the present exemplary embodiment have been described above with reference to FIGS. 1 to 6, and redundant descriptions thereof will be omitted. FIG. 8 is a flowchart illustrating drive control for the lock mechanism 150 of the image blur correction unit 104 (a flowchart illustrating image sensor lock processing).

In the first exemplary embodiment, a technique for driving the unlocked image blur correction unit 104 or 205 to correct the imaging optical axis 1000 in a case where the imaging optical axis 1000 is shifted by the lock mechanism 150 or 210 has been described.

In the present exemplary embodiment, a technique for correcting the shift of the imaging optical axis 1000 caused by the mechanical locking of the image blur correction unit 104 by the lock mechanism 150, by moving the image blur correction unit 104 will be described. Processing in step S201 and subsequent steps (described below) is started when the processing proceeds to step S105 in FIG. 7.

The lock mechanism 150 can be moved in the direction parallel to the imaging optical axis 1000 by a motor and a gear train (not illustrated). When the lock mechanism 150 moves toward the front, the position of the movable unit 104a is mechanically locked by the frictional force from the contact between the elastic members 150a to 150c and the sensor holder 320 of the movable unit 104a. The lock mechanism 150 is further movable toward the front from the position where the elastic members 150a to 150c come into contact with the sensor holder 320 to a lock completion position ze where the elastic members 150a to 150c are elastically deformed. It is thus possible to change the urging force applied to the sensor holder 320 by the elastic members 150a to 150c in a state where the elastic members 150a to 150c are in contact with the sensor holder 320. In a range from the position where the sensor holder 320 comes into contact with the elastic members 150a to 150c to the lock completion position ze, the propulsive force of the movable unit 104a is larger than the frictional force from the contact between the elastic members 150a to 150c and the sensor holder 320. Thus, the movable unit 104a can be driven while being subjected to the frictional force.

In step S201, the system control circuit 101 initializes a variable i to 0. In step S202, the system control circuit 101 sets the position of the image sensor 103a before the mechanical locking as an initial position, and stores a horizontal direction coordinate x0 and a vertical direction coordinate y0 in a plane perpendicular to the imaging optical axis 1000. In the following descriptions, a z direction refers to the direction parallel to the imaging optical axis 1000, an x direction refers to a horizontal-axis direction of the plane perpendicular to the imaging optical axis 1000, and a y direction refers to a vertical-axis direction thereof.

In step S203, the system control circuit 101 moves the lock mechanism 150 in the z direction from an initial position z0 to the lock completion position ze. In step S204, the system control circuit 101 acquires an x-direction position xe and a y-direction position ye of the image sensor 103a immediately after the lock mechanism 150 has moved to the lock completion position ze.

In step S205, the system control circuit 101 calculates an x-direction shift amount xs and a y-direction shift amount ys of the image sensor 103a caused by the movement of the lock mechanism 150 from the initial position z0 to the lock completion position ze, by using the following Formulas (1) and (2):

$$xs = xe - x0 \quad (1)$$

$$ys = ye - y0 \quad (2)$$

The difference between the positions before and after the mechanical locking is represented by the x-direction shift amount xs and the y-direction shift amount ys. The system control circuit 101 determines whether an absolute value of the x-direction shift amount xs is smaller than a predetermined threshold value X, and an absolute value of the y-direction shift amount ys is smaller than a predetermined threshold value Y. If the system control circuit 101 determines that both the absolute values are smaller than the respective threshold values X and Y (YES in step S205), the system control circuit 101 determines that the image sensor 103a remains at the same position (is not shifted) before and after the locking. Then, the preparations for imaging are completed.

If the system control circuit 101 determines that one of the absolute values is equal to or larger than the corresponding threshold value X or Y (NO in step S205), the processing proceeds to step S206. In step S206, the system control circuit 101 moves the lock mechanism 150 in the z direction from the lock completion position ze to a position z(i).

At this time, the position of the lock mechanism 150 in the z direction is as follows. The lock completion position ze is the most anterior position, and the position z(i) is more posterior than the lock completion position ze and is closer to the lock completion position ze with a larger value of i. More specifically, the system control circuit 101 reduces the urging force against the sensor holder 320 by moving the lock mechanism 150 in the z direction from the lock completion position ze to the position z(i).

In step S207, the system control circuit 101 controls the image blur correction unit 104 to move the position of the image sensor 103a to coordinates (x(i), y(i)). The coordinates x(i) and y(i) are represented by following Formulas (3) and (4), respectively:

$$x(i)=x0-xs \quad (3)$$

$$y(i)=y0-ys \quad (4)$$

In step S208, the system control circuit 101 moves the lock mechanism 150 in the z direction from the position z(i) to the lock completion position ze. More specifically, the system control circuit 101 increases the urging force against the sensor holder 320 again. In step S209, similarly to step S204, the system control circuit 101 acquires the x-direction position xe and the y-direction position ye of the image sensor 103a immediately after the lock mechanism 150 has moved to the lock completion position ze.

In step S210, similarly to step S205, the system control circuit 101 determines whether the absolute value of the newly acquired x-direction shift amount xs is smaller than the predetermined threshold value X, and the absolute value of the newly acquired y-direction shift amount ys is smaller than the predetermined threshold value Y. If the system control circuit 101 determines that both the absolute values are smaller than the respective threshold values X and Y (YES in step S210), the system control circuit 101 determines that the image sensor 103a remains at the same position (is not shifted) before and after the locking. Then, the preparation for imaging are completed. If the system control circuit 101 determines that one of the absolute values is equal to or larger than the corresponding threshold value X or Y (NO in step S210), the processing proceeds to step S211. In step S211, the system control circuit 101 determines whether the numerical value of the variable i is larger than 10.

If the system control circuit 101 determines that the numerical value of the variable i is equal to or less than 10 (NO in step S211), the processing proceeds to step S212. In step S212, the system control circuit 101 increments the variable i by one. Then, the processing returns to step S206.

If the system control circuit 101 determines that the numerical value of the variable i is larger than 10 (YES in step S211), the image sensor 103a is still shifted before and after the locking even after the processing in steps S206 to S212 is repeated the specified number of times. Then, the processing proceeds to step S213.

In step S213, the system control circuit 101 determines whether the imaging lens 200 includes the image blur correction unit 205 (whether the imaging lens 200 is capable of image blur correction). For example, the system control circuit 101 acquires information about whether the imaging lens 200 includes the image blur correction unit 205 from the imaging lens 200 via the camera communication unit 2 after starting the preparations for imaging.

If the system control circuit 101 determines that the imaging lens 200 includes the image blur correction unit 205 (YES in step S213), the system control circuit 101 completes the image sensor lock processing. Then, the processing proceeds to step S107 in FIG. 7.

If the system control circuit 101 determines that the imaging lens 200 does not include the image blur correction unit 205 (NO in step S213), the processing proceeds to step S214. In step S214, the system control circuit 101 controls the display unit 54 to display a warning informing the user of the shift of the imaging optical axis 1000, and completes the preparations for imaging.

The present exemplary embodiment can suppress the imaging optical axis 1000 from being shifted when the image blur correction unit 104 is mechanically locked by the lock mechanism 150. Even if the imaging optical axis 1000 is shifted when the image blur correction unit 104 is mechanically locked by the lock mechanism 150, the shift of the imaging optical axis 1000 can be suppressed by using the image blur correction unit 205.

While in the present exemplary embodiment, the combination with the first exemplary embodiment has been described as an example, the image sensor lock processing according to the present exemplary embodiment is applicable to any case where the image sensor 103a is to be mechanically locked, regardless of the other conditions.

The disclosure is not limited to the above-described exemplary embodiments, and the above-described exemplary embodiments can be modified and changed in various ways within the scope of the appended claims.

For example, the processing performed by the system control circuit 101 of the camera 100 in the above-described first and second exemplary embodiments may be performed by a control circuit included in the imaging lens 200.

While in the above-described first and second exemplary embodiments, a known method can be used for the image blur correction processing and detailed descriptions thereof are omitted, the image blur correction may be implemented by using other methods than using the image blur correction units 104 and 205.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-027611, filed Feb. 24, 2021, which is hereby incorporated by reference herein in its entirety.

What is claimed is:

1. An apparatus comprising:
a first correction unit including a first movable unit and a first mechanism configured to lock a position of the first movable unit,
wherein an interchangeable lens including a second correction unit is attachable to and detachable from the apparatus, and the second correction unit includes a second movable unit and a second mechanism configured to lock a position of the second movable unit, and
wherein the apparatus further comprises a control unit configured to, in a case where the interchangeable lens is attached to the apparatus and one of the first movable unit and the second movable unit is fixed by the first mechanism or the second mechanism, move the position of the other of the first movable unit and the second movable unit in a direction that cancels a shift of an optical axis caused by the fixation of the one of the first movable unit and the second movable unit.

2. The apparatus according to claim 1, further comprising a determination unit configured to determine whether to lock the first movable unit or the second movable unit,
wherein the determination unit performs the determination based on a mode of the apparatus.

3. The apparatus according to claim 2, wherein in a case where the mode is an energy-saving mode, the determination unit determines to lock at least one of the first movable unit or the second movable unit.

4. The apparatus according to claim 2, wherein the determination unit determines to lock one of the first movable unit and the second movable unit, based on information about a focal length of the interchangeable lens.

5. The apparatus according to claim 4, wherein in a case where the information about the focal length of the interchangeable lens indicates that the focal length is shorter than a predetermined focal length, the determination unit determines to lock the second movable unit.

6. The apparatus according to claim 2, wherein the determination unit determines to lock one of the first movable unit and the second movable unit, based on information about a remaining battery level of the apparatus.

7. The apparatus according to claim 6, wherein in a case where the information about the remaining battery level of the apparatus indicates that the remaining battery level is less than a predetermined remaining battery level, the determination unit determines to lock the second movable unit.

8. The apparatus according to claim 1, further comprising a detection unit configured to detect the position of the first movable unit,
wherein in a case where a difference between the detected positions before and after the first movable unit is locked exceeds a predetermined threshold value, the control unit moves the position of the first movable unit.

9. The apparatus according to claim 8,
wherein the first mechanism locks the first movable unit by applying an urging force to the first movable unit in a direction parallel to the optical axis, and
wherein in a case where the difference between the detected positions before and after the first movable unit is locked exceeds the predetermined threshold value, the control unit reduces the urging force once, moves the position of the first movable unit, and then increases the urging force.

10. The apparatus according to claim 1, wherein in a case where an interchangeable lens not including the second correction unit is attached to the apparatus and the shift of the optical axis occurs when the second movable unit is locked, the control unit controls a display unit to display a warning.

11. The apparatus according to claim 1, wherein the apparatus is an imaging apparatus.

12. An apparatus comprising:
a first correction unit including a first movable unit and a first mechanism configured to lock a position of the first movable unit; and
a second correction unit including a second movable unit and a second mechanism configured to lock a position of the second movable unit,
wherein the apparatus corrects a blur of an image formed on a sensor, by using the first correction unit and the second correction unit, and
wherein the apparatus further comprises a control unit configured to, in a case where one of the first movable unit and the second movable unit is fixed by the first mechanism or the second mechanism, move the position of the other of the first movable unit and the second movable unit in a direction that cancels a shift of an optical axis caused by the fixation of the one of the first movable unit and the second movable unit.

13. The apparatus according to claim 12, further comprising a determination unit configured to determine whether to lock the first movable unit or the second movable unit,
wherein the determination unit performs the determination based on a mode of the apparatus.

14. The apparatus according to claim 12, further comprising a detection unit configured to detect the position of the first movable unit,
wherein in a case where a difference between the detected positions before and after the first movable unit is locked exceeds a predetermined threshold value, the control unit moves the position of the first movable unit.

15. The apparatus according to claim 12, wherein the apparatus is an imaging apparatus.

16. A correction apparatus comprising:
a first correction unit including a first movable unit and a first mechanism configured to lock a position of the first movable unit,
wherein a second correction apparatus including a second correction unit is attachable to and detachable from the correction apparatus, and the second correction unit includes a second movable unit and a second mechanism configured to lock a position of the second movable unit, and
wherein the correction apparatus further comprises a control unit configured to, in a case where the second correction apparatus is attached to the correction apparatus and one of the first movable unit and the second movable unit is fixed by the first mechanism or the second mechanism, move the position of the other of the first movable unit and the second movable unit in a direction that cancels a shift of an optical axis caused by the fixation of the one of the first movable unit and the second movable unit.

17. The correction apparatus according to claim 16, further comprising a determination unit configured to determine whether to lock the first movable unit or the second movable unit,
wherein the determination unit performs the determination based on a mode of the apparatus.

18. The correction apparatus according to claim 16, further comprising a detection unit configured to detect the position of the first movable unit,
wherein in a case where a difference between the detected positions before and after the first movable unit is locked exceeds a predetermined threshold value, the control unit moves the position of the first movable unit.

19. A correction method for correcting a blur of an image formed on a sensor, by using a first correction unit including a first movable unit and a first mechanism configured to lock a position of the first movable unit, and using a second correction unit including a second movable unit and a second mechanism configured to lock a position of the second movable unit, the correction method comprising:
in a case where one of the first movable unit and the second movable unit is fixed by the first mechanism or the second mechanism, moving the position of the other of the first movable unit and the second movable unit in a direction that cancels a shift of an optical axis caused by the fixation of the one of the first movable unit and the second movable unit.

20. The correction method according to claim 19, further comprising:
determining whether to lock the first movable unit or the second movable unit;
detecting the position of the first movable unit; and
moving the positions of the first movable unit in a case where a difference between the detected positions before and after the first movable unit is locked exceeds a predetermined threshold value.

* * * * *